(12) United States Patent
Manikantan Shila et al.

(10) Patent No.: US 12,010,512 B2
(45) Date of Patent: Jun. 11, 2024

(54) SYSTEM AND METHOD OF MOBILE BASED USER AUTHENTICATION FOR AN ACCESS CONTROLLED ENVIRONMENT

(71) Applicant: Carrier Corporation, Jupiter, FL (US)

(72) Inventors: Devu Manikantan Shila, West Hartford, CT (US); Kunal Srivastava, Manchester, CT (US); Paul C. O'Neill, New Britain, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 504 days.

(21) Appl. No.: 16/610,026

(22) PCT Filed: Feb. 26, 2018

(86) PCT No.: PCT/US2018/019705
§ 371 (c)(1),
(2) Date: Oct. 31, 2019

(87) PCT Pub. No.: WO2018/208358
PCT Pub. Date: Nov. 15, 2018

(65) Prior Publication Data
US 2020/0077261 A1    Mar. 5, 2020

Related U.S. Application Data

(60) Provisional application No. 62/492,610, filed on May 1, 2017.

(51) Int. Cl.
*H04W 12/06* (2021.01)
*G06F 21/32* (2013.01)
(Continued)

(52) U.S. Cl.
CPC ............ *H04W 12/06* (2013.01); *G06F 21/32* (2013.01); *H04L 67/535* (2022.05);
(Continued)

(58) Field of Classification Search
CPC ....... H04W 12/06; H04W 12/08; H04W 4/80; H04W 12/63; H04W 12/68; H04W 88/02; G06F 21/32; H04L 67/22
See application file for complete search history.

(56) References Cited

U.S. PATENT DOCUMENTS 4,763,121 A    8/1988  Tomoda et al.
8,892,461 B2   11/2014 Lau et al.
(Continued)

FOREIGN PATENT DOCUMENTS

AU    2015203832 A1 *  7/2015
CN    104318138 A      1/2015
(Continued)

OTHER PUBLICATIONS

Assa Abloy, "HID Mobile Access signals new a era in security solutions", available at: https://web/archive.org/web/20170328140055/ https://www.assaabloy.com/en/com/press-news/news/2014/hid-mobile-access-signals-new-era-in-security-solutions-/, accessed Sep. 26, 2018, 3 pages.

(Continued)

*Primary Examiner* — Austin J Moreau
(74) *Attorney, Agent, or Firm* — CANTOR COLBURN LLP

(57) ABSTRACT

A method of mobile based user authentication includes storing a plurality of categories of data associated with user activity with a mobile device carried or worn by a user. The method also includes analyzing the plurality of categories of data over a recent period of time to determine a user trust score based on a historical period of time, the historical period of time greater than the recent period of time. The method further includes granting access to an access controlled environment if the user trust score is within a predetermined score range.

16 Claims, 2 Drawing Sheets

(51) Int. Cl.
  *H04L 67/50*  (2022.01)
  *H04W 12/08*  (2021.01)
  *H04W 12/64*  (2021.01)
  *H04W 4/80*   (2018.01)
  *H04W 12/68*  (2021.01)
  *H04W 88/02*  (2009.01)

(52) U.S. Cl.
  CPC ......... *H04W 12/08* (2013.01); *H04W 12/64* (2021.01); *H04W 4/80* (2018.02); *H04W 12/68* (2021.01); *H04W 88/02* (2013.01)

(56) References Cited

U.S. PATENT DOCUMENTS

| | | | |
|---|---|---|---|
| 9,057,210 B2 | 6/2015 | Dumas et al. | |
| 9,406,180 B2 | 8/2016 | Eberwine et al. | |
| 10,621,581 B2* | 4/2020 | Van Os | G06Q 20/29 |
| 2013/0102283 A1 | 4/2013 | Lau et al. | |
| 2014/0085050 A1* | 3/2014 | Luna | G07C 9/37 340/5.82 |
| 2014/0265359 A1 | 9/2014 | Cheng et al. | |
| 2015/0096876 A1 | 4/2015 | Mittleman et al. | |
| 2015/0149781 A1 | 5/2015 | Logue | |
| 2016/0055487 A1 | 2/2016 | Votaw et al. | |
| 2016/0091879 A1 | 3/2016 | Marti et al. | |
| 2016/0105424 A1 | 4/2016 | Logue et al. | |
| 2016/0188848 A1 | 6/2016 | Smith et al. | |
| 2016/0189453 A1 | 6/2016 | Johnson et al. | |
| 2016/0373917 A1 | 12/2016 | Logue et al. | |
| 2017/0034183 A1 | 2/2017 | Enqvist et al. | |
| 2018/0108192 A1* | 4/2018 | Ho | H04L 67/125 |
| 2018/0288041 A1* | 10/2018 | Zavesky | H04L 63/0815 |

FOREIGN PATENT DOCUMENTS

| | | | | |
|---|---|---|---|---|
| CN | 105843051 A | | 8/2016 | |
| GB | 2541807 A | * | 3/2017 | ......... G06K 9/00335 |
| WO | 2011001026 A1 | | 1/2011 | |

OTHER PUBLICATIONS

International Search Report and Written Opinion for application PCT/US2018/019705, dated Oct. 5, 2018, 17 pages.

UltraloqA, "Fingerprint and Touchscreen Smart Lock", available at: https://web.archive.org/web/20161104042950/http:www.u-tec.com:80/lock/ul3/bt.jtml, accessed Sep. 26, 2018, 13 pages.

Wollerton, Megan, "Control a smart lock with your voice: Good idea or bad idea?", CNET, Mar. 2017, 3 pages.

* cited by examiner

SYSTEM AND METHOD OF MOBILE BASED USER AUTHENTICATION FOR AN ACCESS CONTROLLED ENVIRONMENT

FEDERAL RESEARCH STATEMENT

This invention was made with Government support under contract number D15PC00155 awarded by the Science and Technology Directorate of the United States Department of Homeland Security. The Government has certain rights in the invention.

BACKGROUND

Mobile devices may be used to manage and access many devices and environments (e.g., thermostats, door locks, garage, etc.). In the case of access control solutions, while accessing door locks, a user must perform several time consuming and thereby inconvenient steps. This may include entering a mobile device passcode or PIN to access available applications, opening the mobile device application, and entering lock specific passcodes, for example.

Wireless communication between a lock and a mobile device also may involve very strong cryptographic operations which cause communication latencies. Currently, it would take approximately five or more seconds to open the lock via the wireless communication after the access verification steps have been performed by the user. More importantly, the passcodes are vulnerable to classic cybersecurity threats.

Accordingly, access control may be improved, both with respect to user convenience and from a security standpoint.

BRIEF SUMMARY

Disclosed is a method of mobile based user authentication. The method includes storing a plurality of categories of data associated with user activity with a mobile device carried or worn by a user. The method also includes analyzing the plurality of categories of data over a recent period of time to determine a user trust score based on a historical period of time, the historical period of time greater than the recent period of time. The method further includes granting access to an access controlled environment if the user trust score is within a predetermined score range.

In addition to one or more of the features described above, or as an alternative, further embodiments may include that analyzing the plurality of categories of data is initiated once the mobile device is located within a predetermined distance of the access controlled environment.

In addition to one or more of the features described above, or as an alternative, further embodiments may include granting access to the access controlled environment subsequent to the user providing a user intent signal.

In addition to one or more of the features described above, or as an alternative, further embodiments may include that the user intent signal comprises tapping the mobile device.

In addition to one or more of the features described above, or as an alternative, further embodiments may include that the user intent signal comprises shaking the mobile device.

In addition to one or more of the features described above, or as an alternative, further embodiments may include that the user intent signal comprises providing a voice command.

In addition to one or more of the features described above, or as an alternative, further embodiments may include that granting access to the access controlled environment comprises unlocking a lock associated with an entry point of the access controlled environment.

In addition to one or more of the features described above, or as an alternative, further embodiments may include that the plurality of categories of data comprises at least one of location history, mobile device use, activity level, and biometrics.

In addition to one or more of the features described above, or as an alternative, further embodiments may include that the access controlled environment is a residential home.

In addition to one or more of the features described above, or as an alternative, further embodiments may include that the access controlled environment is a commercial office space.

Also disclosed is a method of mobile based user authentication. The method includes storing a plurality of categories of data associated with user activity with a mobile device carried or worn by a user to determine a user pattern over a historical period of time. The method also includes analyzing the plurality of categories of data over a recent period of time to determine a user trust score based on the user pattern, the recent period of time less than the historical period of time. The method further includes analyzing a risk value as a function of a plurality of variables, the user trust score one of the plurality of variables. The method yet further includes granting access to an access controlled environment if the risk value is within a predetermined value.

In addition to one or more of the features described above, or as an alternative, further embodiments may include that analyzing the plurality of categories of data is initiated once the mobile device is located within a predetermined distance of the access controlled environment.

In addition to one or more of the features described above, or as an alternative, further embodiments may include granting access to the access controlled environment subsequent to the user providing a user intent signal.

In addition to one or more of the features described above, or as an alternative, further embodiments may include that the user intent signal comprises tapping the mobile device.

In addition to one or more of the features described above, or as an alternative, further embodiments may include that the user intent signal comprises shaking the mobile device.

In addition to one or more of the features described above, or as an alternative, further embodiments may include that the user intent signal comprises providing a voice command.

In addition to one or more of the features described above, or as an alternative, further embodiments may include that granting access to the access controlled environment comprises unlocking a lock associated with an entry point of the access controlled environment.

In addition to one or more of the features described above, or as an alternative, further embodiments may include that the plurality of categories of data comprises at least one of location history, mobile device use, activity level, and biometrics.

In addition to one or more of the features described above, or as an alternative, further embodiments may include that the access controlled environment is a residential home.

In addition to one or more of the features described above, or as an alternative, further embodiments may include that the access controlled environment is a commercial office space.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
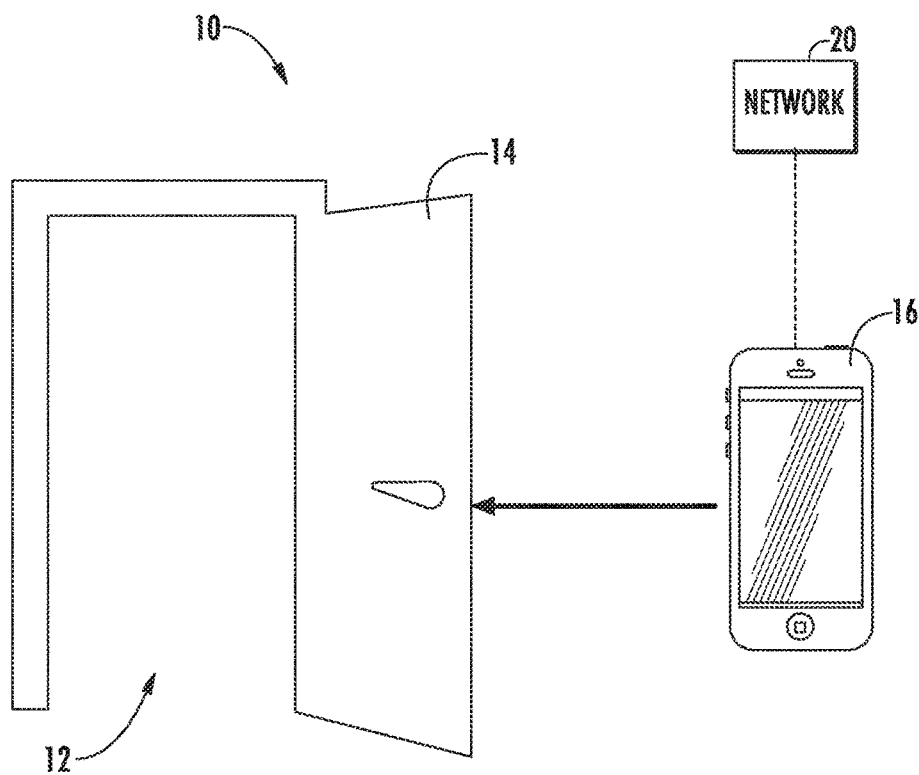
FIG. 1 is a simplified schematic illustration of an access control system.

FIG. 1 depicts an environment 10 in an example embodiment. In some embodiments, the environment 10 is a building, residential or commercial, a part of a building, or a collection of buildings that are physically located near each other. The environment 10 includes an access controlled location 12. The access controlled location 12 may be a room or otherwise enclosed space that is secured with at least one entry point 14, such as the illustrated door. It is to be appreciated that the access controlled location 12 may be a door of a home or garage in the case of a residential structure.

In addition to the building environment described above, the embodiments described herein may be applicable to an outdoor setting with access controlled areas or to a building with an elevator system. In the case of the elevator system, certain elevator cars or floor destinations of the building may be access controlled, such that an access request must be granted by the access control system described herein.

Regardless of the particular environment that is access controlled, the entry point 14 is in a locked condition and access must be granted to a user in response to an access request. As illustrated and described herein, a mobile device 16 is employed to communicate with a lock of the entry point 14 and to send an access request. The mobile device 16 may be a device that is carried by a person, such as a smart phone, PDA, tablet, etc. Furthermore, the mobile device 16 may be wearable items, such as a smart watch, eyewear, etc. The mobile device 16 may include a processor, memory and a communication module. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in the mobile device 16 including executable instructions stored therein, for instance, as firmware.

The mobile device 16 is in wireless and operative communication with a lock 18 (FIG. 2) of the access point 14. The communication between the mobile device 16 and the lock 18 may be facilitated through one or more network components 20 associated with a wireless network, such as a cloud network or telecommunication network. Examples of wireless networks that may be utilized include Bluetooth, Near Field Communication (NFC) and Wi-Fi.

Figure 2:
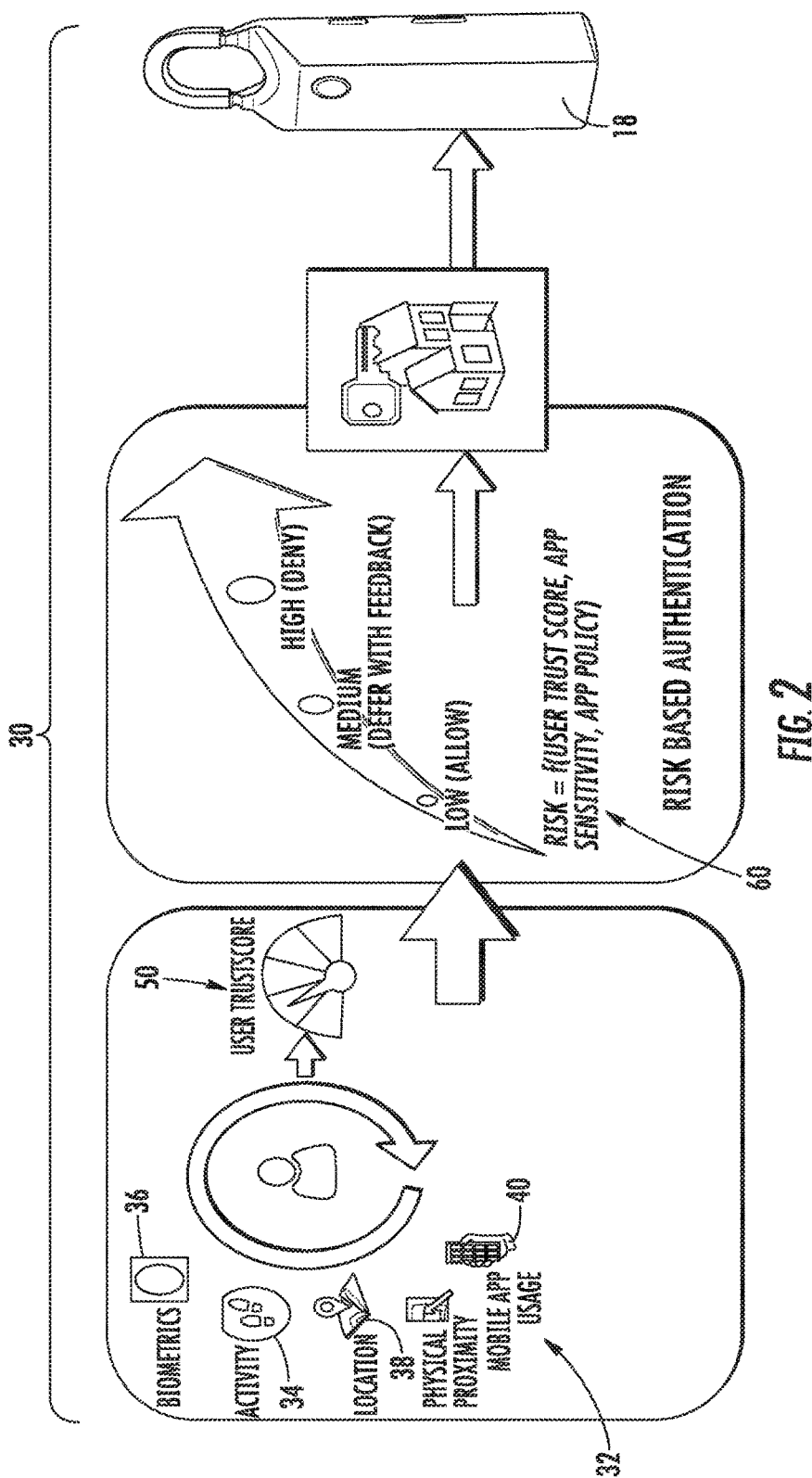
FIG. 2 illustrates a system and method associated with use of the access control system.

Referring now to FIG. 2, an access control system and method is illustrated and generally referenced with numeral 30. The illustrated embodiment pertains to a home with a security system installed for controlling one or more lockable entry points. However, as discussed above, any locked environment that requires the granting of access may benefit from the embodiments described herein, such that the illustrated embodiment is not limiting of the environments that may incorporate the embodiments described herein.

The mobile device 16 that is carried or worn by a user is configured to detect various activities of the user. In other words, at least one, but typically a plurality of categories of data 32 related to user activity is detected and stored on the mobile device 16 or with a remote medium, such as a wireless telecommunication network or a cloud network.

The categories of data 32 may be any data associated with activities of a user that are detected and stored over a historical period of time. The historical period of time may vary in duration depending upon the particular application. Regardless of how long the historical period is defined as, the period provides a large enough sample size to confidently ascertain the habits and patterns of the user based on the detected and stored categories of data tracked by the mobile device 16.

In some embodiments, the historical period of time may correspond to a training phase that is triggered once the user installs the access control application on the mobile device 16. The training phase allows the mobile device 16 to learn various user activities, such as his walking patterns, his location transition patterns (e.g., user coming home from work), his skin temperature, his heart rate, whether the device is carried on his pocket (or phone placements). The training phase may be the first week, for example, but many alternative suitable time periods are contemplated. After the training phase, the mobile device 16 switches to a deployment phase where it uses the learned behavior models of the user (e.g., activity pattern, location pattern, skin temperature, heart rate) to predict if he is the real (i.e., authorized) user. The preceding examples are merely illustrative and some are discussed in more detail below in connection with the categories of data.

The device will also include modules to retrain the learning algorithm when needed. The behavior of the user can change over time. For instance his location transition patterns when he moves to a new residence or workplace, etc. In order to account for such behavioral changes over time, a retraining module that retrains the learned user behavior model when new samples are seen is provided in some embodiments. In order to prevent learning of unseen but malicious samples, the user will be requested to enter an active factor (e.g., biometric or a PIN number). If the user is authenticated, a new sample will be sent to the Cloud where it will learn the new model based on his old and new samples.

Various examples of the categories of data 32 are discussed herein, but the examples are not limiting of the categories that may be employed. One or more physical activity levels 34 may be monitored. For example, the unique walking pattern of the user may be studied by the mobile device 16. The walking pattern may include length of stride and speed of stride. Additionally, the number of steps taken by the user over a given time period (e.g., hours, days, etc.), when such activity is performed (e.g., certain times of day), and the time of exercising may be monitored. Furthermore, one or more biometrics 36, such as average heart rate, may be monitored. A user's GPS location history 38 may be monitored to determine a travel pattern of the user. The usage 40 of the mobile device, such as game playing, social media usage, etc., may be monitored to determine usage patterns. As noted above, the examples discussed are not exhaustive of factors that may be monitored.

The categories of data 32 are analyzed to determine a user trust score 50 that provides a level of confidence that the mobile device 16 is in the presence of the trusted user (e.g., being carried or worn by user) that is authorized to access the access controlled environment. The user trust score 50 is determined by analysis of the categories of data 32 over a recent period of time that is less than the historical period of time. It is to be appreciated that the recent period of time may vary in duration based on the application of use. In some embodiments, the recent period of time is a number of hours or a number of days. Analysis of the categories of data over the recent time period allows the user trust score 50 to determine if recent activity detected by the mobile device 16 corresponds to the known patterns and habits of the authorized user based on the collection of data over the historical time period. In other words, each category analyzed over the recent period of time that does not correspond to the category data analyzed over the historical period of time alters the user trust score. An algorithm is programmed on the mobile device 16, on a wireless telecommunication network or cloud network, with the algorithm determining the user trust score 50.

In some embodiments, the user trust score 50 is the sole determining factor regarding whether access to the access controlled environment is granted. Therefore, if the user trust score 50 is within a predetermined range then access granted. It is to be appreciated that the algorithm may be structured such that a higher score is indicative of a higher degree of confidence that the user of the mobile device 16 is the authorized user. In such embodiments, the user trust score 50 must exceed a threshold score to provide access. Conversely, the algorithm may be structured such that a lower score is indicative of a higher degree of confidence that the user of the mobile device 16 is the authorized user. In such embodiments, the user trust score 50 must be lower than a threshold score to provide access. In an embodiment where the user trust score 50 is the sole determining factor, if the score is within the predetermined range then access is granted, such as by unlocking the entry point 14.

In some embodiments, the user trust score 50 is merely one factor that is part of an algorithm that determines an overall risk factor associated with granting access. Such an algorithm and process is illustrated and generally referenced with numeral 60 in FIG. 2. Other factors that may be employed include policies and the sensitivity of the mobile device application that controls access. As illustrated, if the risk is deemed too high based on the algorithm, access is denied. If the risk is deemed low and within a predetermined value based on the algorithm, access is granted. In some embodiments, an intermediate value that indicates a medium risk results in a requirement for further feedback to be provided by the user. For example, a biometric test may be required, such as fingerprint analysis, eye scan, voice recognition, etc. There are merely examples of the additional feedback that may be required.

Analysis of the data employed to determine whether access is to be granted is initiated once the mobile device 16, and therefore the user, is located within certain proximity of a component of the security system that is responsible for the access controlled environment. The component may be the lock 18 itself or a central unit that is in operative communication with the lock 18. Therefore, the mobile device 16 application senses when the mobile device 16 is located within a predetermined distance of the security system component and triggers initiation of the analysis that is described in detail above. This alleviates the need for the user to take action.

In some embodiments, access is still not granted even after the user trust score 50 and/or the overall risk algorithm indicate authentication of the user. This avoids unintentional granting of access, such as unlocking doors when the user is in close proximity. In such embodiments, a user intent signal is required to signify user intent to access the environment and complete the access request. The user intent signal may be a physical signal that requires contact between the user and the mobile device 16. Examples of physical signals include tapping the mobile device, shaking the mobile device. The user intent signal may be a voice command provided by the user. Regardless of what user intent signal is required, inadvertent opening of locks is avoided.

In operation, the system and method described herein provide users in the operating environment with a nearly seamless and interactive access request experience. Advantageously, the user may step into the environment and receive the granting of access without interacting with anything other than their mobile device 16 and even then only doing so in a minimalistic fashion.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more methodological acts as described herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of mobile based user authentication comprising:

storing a plurality of categories of data associated with user activity with a mobile device carried or worn by a user;

analyzing the plurality of categories of data over a recent period of time to determine a user trust score based on a historical period of time, the historical period of time greater than the recent period of time;

subsequent to the user providing a user intent signal to the mobile device, granting access to an access controlled environment if the user trust score is within a predetermined score range;

wherein analyzing the plurality of categories of data is initiated once the mobile device is located within a predetermined distance of the access controlled environment;

wherein the plurality of categories of data comprises physical activity levels, a unique walking pattern of the user including length of stride and speed of stride, a number of steps taken by the user over a given time period, a time of day when physical activity is performed, a time of exercising, one or more biometrics including average heart rate, a user's GPS location history, a travel pattern of the user and usage patterns of the mobile device.

2. The method of claim 1, wherein the user intent signal comprises tapping the mobile device.

3. The method of claim 1, wherein the user intent signal comprises shaking the mobile device.

4. The method of claim 1, wherein the user intent signal comprises providing a voice command.

5. The method of claim 1, wherein granting access to the access controlled environment comprises unlocking a lock associated with an entry point of the access controlled environment.

6. The method of claim 1, wherein the plurality of categories of data comprises at least one of location history, mobile device use, activity level, and biometrics.

7. The method of claim 1, wherein the access controlled environment is a residential home.

8. The method of claim 1, wherein the access controlled environment is a commercial office space.

9. A method of mobile based user authentication comprising:
- storing a plurality of categories of data associated with user activity with a mobile device carried or worn by a user to determine a user pattern over a historical period of time;
- analyzing the plurality of categories of data over a recent period of time to determine a user trust score based on the user pattern, the recent period of time less than the historical period of time;
- analyzing a risk value as a function of a plurality of variables, the user trust score one of the plurality of variables; and
- subsequent to the user providing a user intent signal to the mobile device, granting access to an access controlled environment if the risk value is within a predetermined value;
- wherein analyzing the plurality of categories of data is initiated once the mobile device is located within a predetermined distance of the access controlled environment;
- wherein the plurality of categories of data comprises physical activity levels, a unique walking pattern of the user including length of stride and speed of stride, a number of steps taken by the user over a given time period, a time of day when physical activity is performed, a time of exercising, one or more biometrics including average heart rate, a user's GPS location history, a travel pattern of the user and usage patterns of the mobile device.

10. The method of claim 9, wherein the user intent signal comprises tapping the mobile device.

11. The method of claim 9, wherein the user intent signal comprises shaking the mobile device.

12. The method of claim 9, wherein the user intent signal comprises providing a voice command.

13. The method of claim 9, wherein granting access to the access controlled environment comprises unlocking a lock associated with an entry point of the access controlled environment.

14. The method of claim 9, wherein the plurality of categories of data comprises at least one of location history, mobile device use, activity level, and biometrics.

15. The method of claim 9, wherein the access controlled environment is a residential home.

16. The method of claim 9, wherein the access controlled environment is a commercial office space.

* * * * *